(12) United States Patent
Park

(10) Patent No.: US 11,913,782 B2
(45) Date of Patent: Feb. 27, 2024

(54) METHOD AND DEVICE FOR EVALUATING DISPERSION OF BINDER IN ELECTRODE MIXTURE LAYER

(71) Applicant: LG Energy Solution, Ltd., Seoul (KR)

(72) Inventor: Ji Hye Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 254 days.

(21) Appl. No.: 17/634,409

(22) PCT Filed: Nov. 19, 2020

(86) PCT No.: PCT/KR2020/016370
§ 371 (c)(1),
(2) Date: Feb. 10, 2022

(87) PCT Pub. No.: WO2021/118100
PCT Pub. Date: Jun. 17, 2021

(65) Prior Publication Data
US 2022/0316853 A1  Oct. 6, 2022

(30) Foreign Application Priority Data
Dec. 9, 2019  (KR) .......................... 10-2019-0162497

(51) Int. Cl.
*G01B 7/06* (2006.01)
*H01M 4/62* (2006.01)
(52) U.S. Cl.
CPC .............. *G01B 7/06* (2013.01); *H01M 4/621* (2013.01)

(58) Field of Classification Search
CPC .... G01B 7/06; H01M 4/621; H01M 10/4285; H01M 4/04; G01N 27/041; G01N 27/416; G01N 27/4161; Y02E 60/10; G01R 31/36
See application file for complete search history.

(56) References Cited

U.S. PATENT DOCUMENTS

| 9,588,072 B2 | 3/2017 | Kawamuro et al. |
| 11,043,336 B2 * | 6/2021 | Voelker ................. H01M 4/139 |
| 11,264,599 B2 | 3/2022 | Kim et al. |

(Continued)

FOREIGN PATENT DOCUMENTS

| CN | 104977470 A | 10/2015 |
| CN | 108519407 A | 9/2018 |

(Continued)

OTHER PUBLICATIONS

Kwon et al., "Toward Uniformly Dispersed Battery Electrode Composite Materials: Characteristics and Performance," ACS Applied Materials & Interfaces, vol. 8, No. 5, 3452-3468 (2016).

(Continued)

*Primary Examiner* — Giovanni Astacio-Oquendo
*Assistant Examiner* — Zannatul Ferdous
(74) *Attorney, Agent, or Firm* — Morgan, Lewis & Bockius LLP

(57) ABSTRACT

The present invention relates to a method and device for evaluating the thickness-direction dispersion of a binder in a mixture layer of an electrode. The thickness-direction dispersion of the binder in the mixture layer of the electrode can be evaluated through a non-destructive method.

11 Claims, 9 Drawing Sheets

(56) References Cited

U.S. PATENT DOCUMENTS

| | | | |
|---|---|---|---|
| 2007/0154788 A1* | 7/2007 | Hong | H01M 4/13 |
| | | | 429/185 |
| 2014/0210480 A1 | 7/2014 | Hamaguchi | |
| 2015/0293043 A1 | 10/2015 | Kawamuro et al. | |
| 2020/0141977 A1 | 5/2020 | Kaguchi et al. | |
| 2020/0166580 A1 | 5/2020 | Jung et al. | |

FOREIGN PATENT DOCUMENTS

| | | |
|---|---|---|
| CN | 110537093 A | 12/2019 |
| EP | 2755274 A1 | 7/2014 |
| JP | 2007-309797 A | 11/2007 |
| JP | 4842549 B2 | 12/2011 |
| JP | 5146225 B2 | 2/2013 |
| JP | 2015-069868 A | 4/2015 |
| JP | 5975274 B2 | 8/2016 |
| JP | 6345399 B2 | 6/2018 |
| JP | 2019-153469 A | 9/2019 |
| KR | 10-2009-0128161 A | 12/2009 |
| KR | 10-2015-0118542 A | 10/2015 |
| KR | 10-2017-0061450 A | 6/2017 |
| KR | 10-2017-0065175 A | 6/2017 |
| KR | 10-1748929 B1 | 6/2017 |
| KR | 10-1982571 B1 | 5/2019 |
| KR | 10-2019-0092767 A | 8/2019 |
| WO | 2018/078752 A1 | 5/2018 |

OTHER PUBLICATIONS

Hardy et al., "Flexible probe for measuring local conductivity variations in Li-ion electrode films," AIP Conference Proceedings, vol. 1949 (2018).

Extended European Search Report issued in corresponding European Patent Application No. 20899245.3 dated Jul. 4, 2022.

International Search Report issued in corresponding International Patent Application No. PCT/KR2020/016370 dated Feb. 24, 2021.

Office action dated Aug. 29, 2023 issued in corresponding Chinese Patent Application No. 202080052573.2.

* cited by examiner

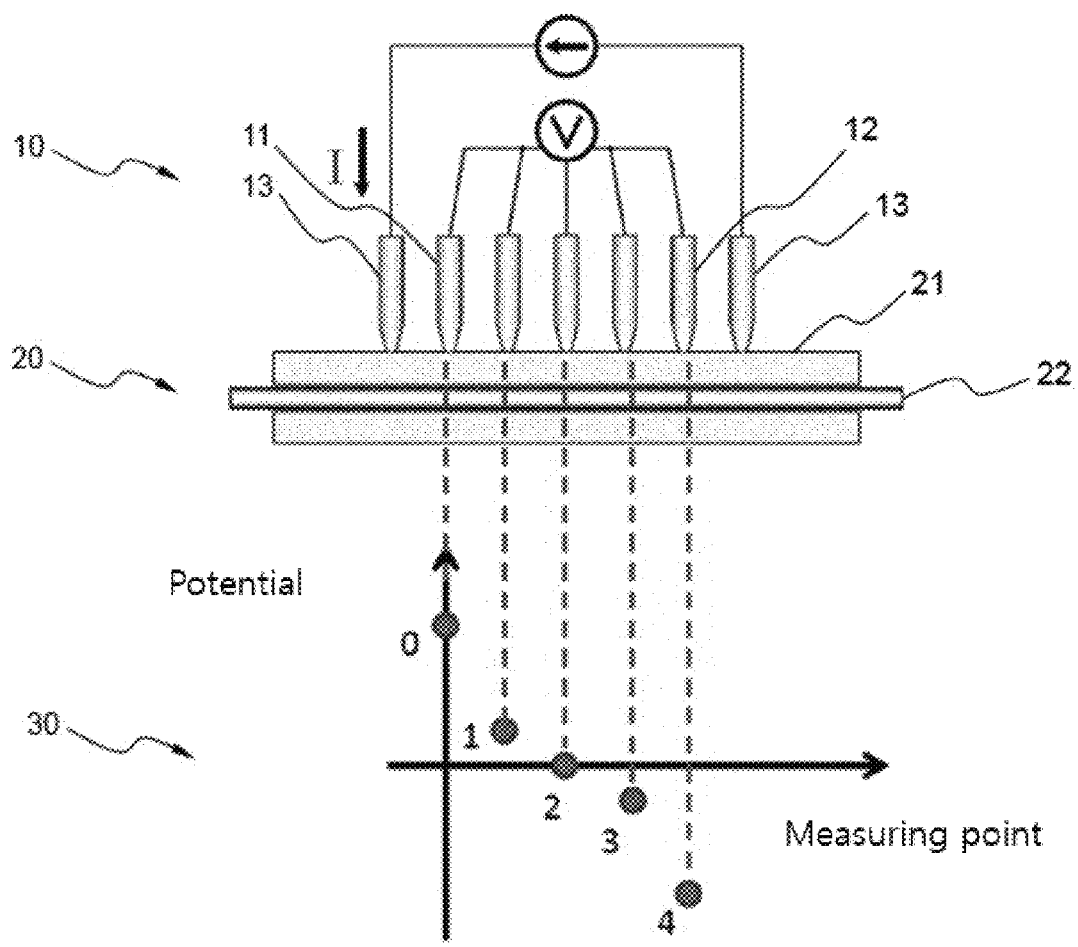
[FIG. 1]

[FIG. 2]
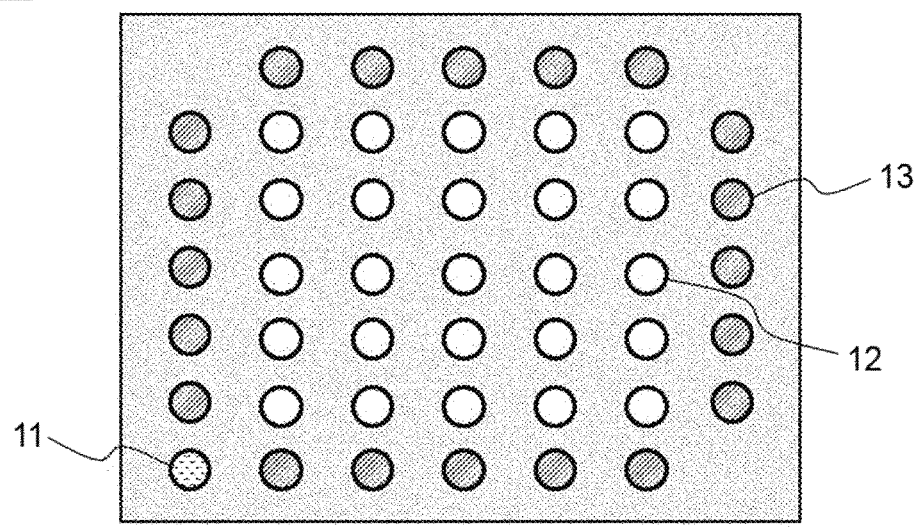

[FIG. 3]
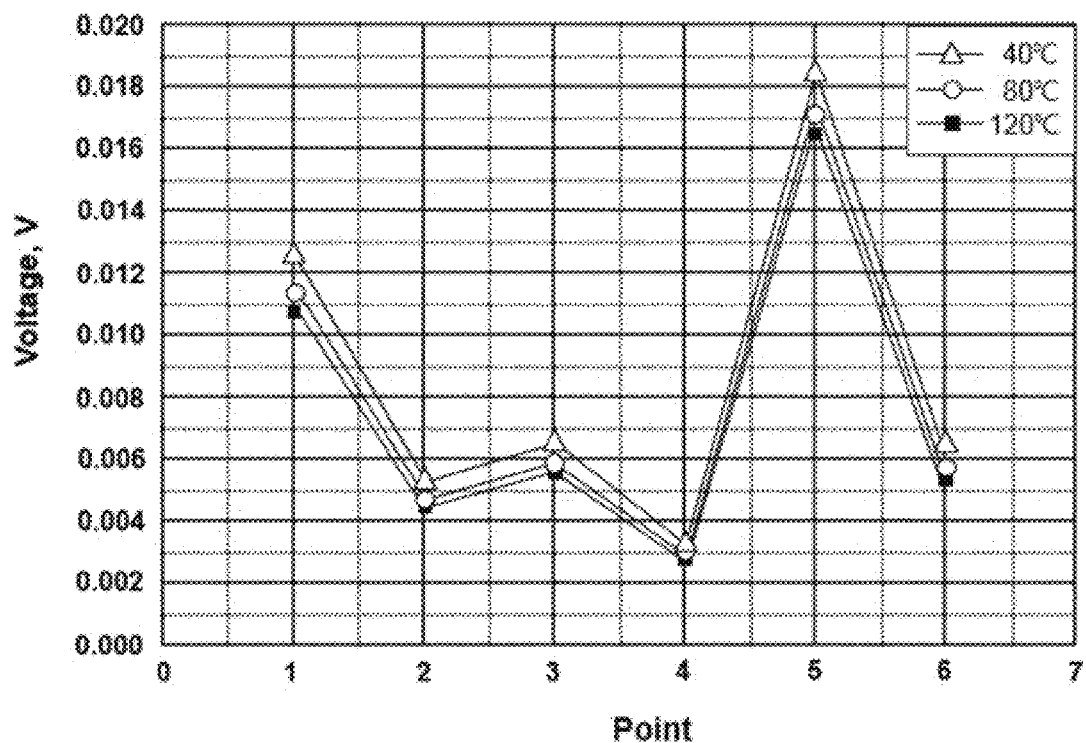

[FIG. 4]
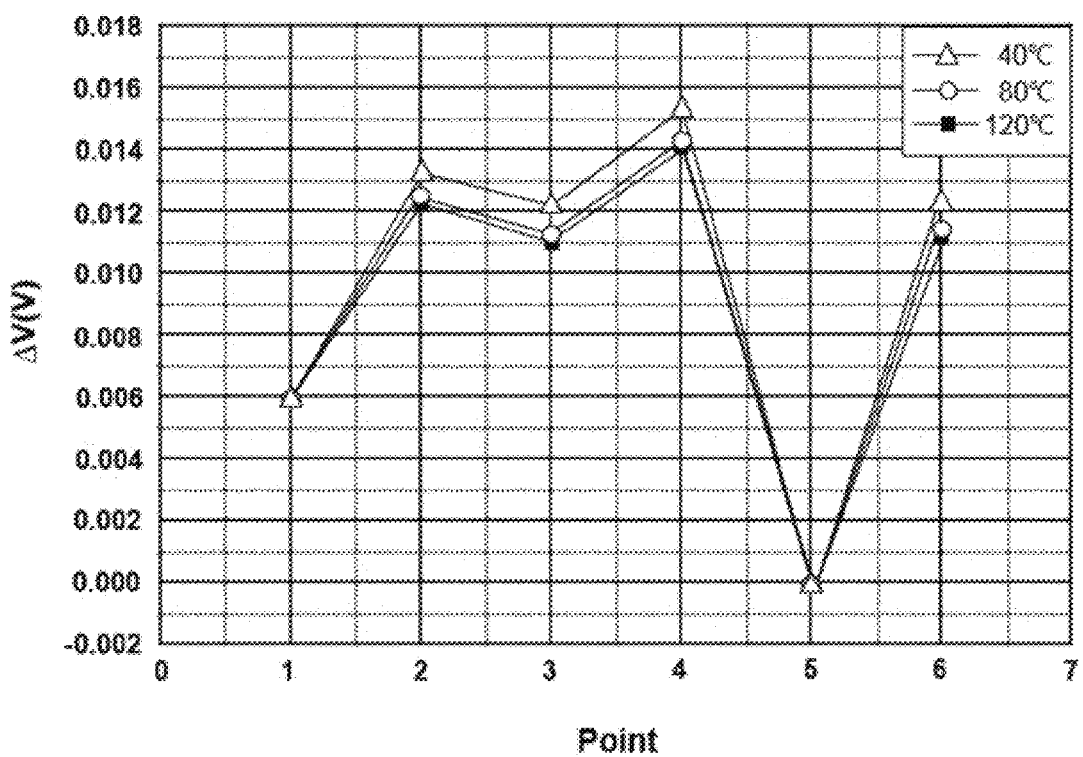

[FIG. 5]
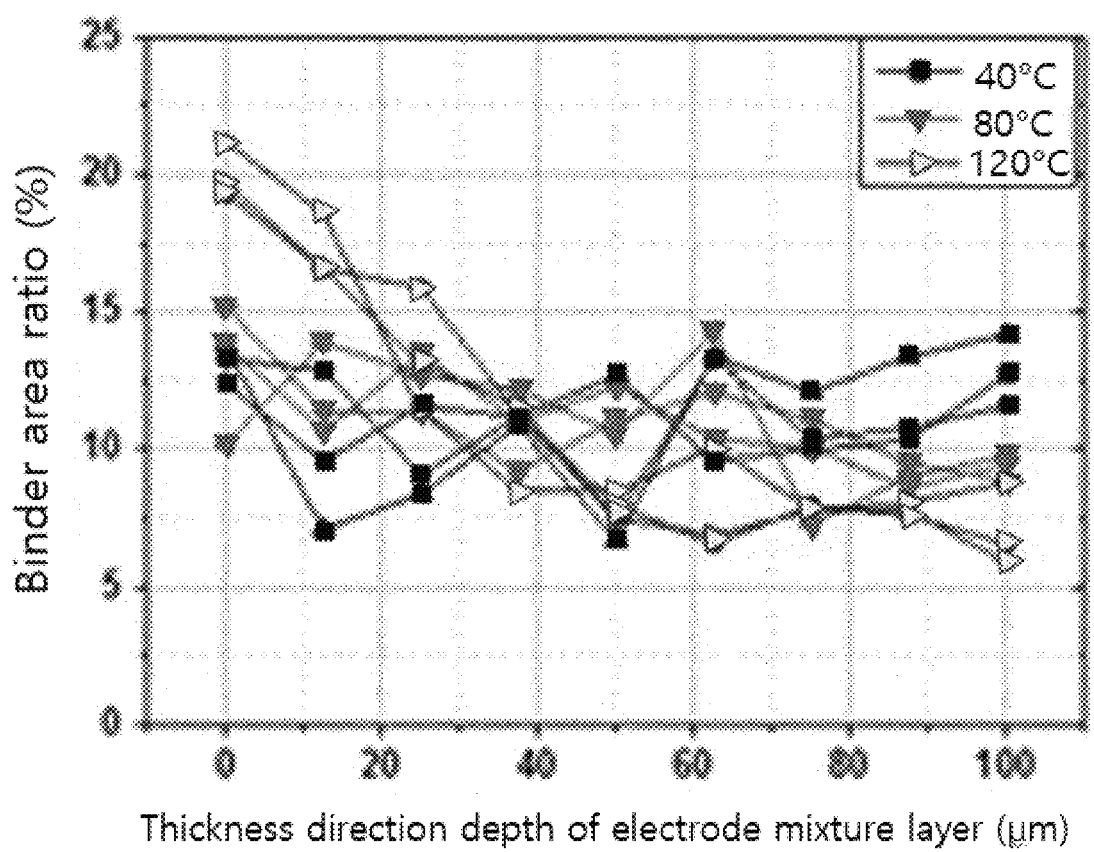

[FIG. 6]
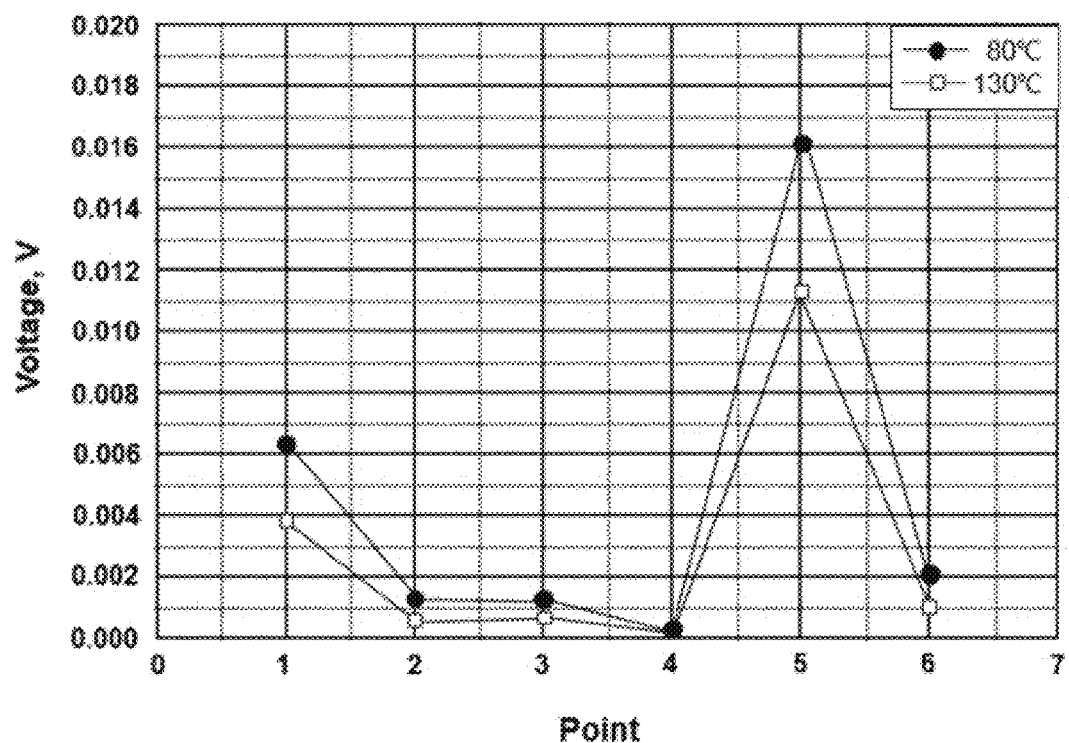

[FIG. 7]
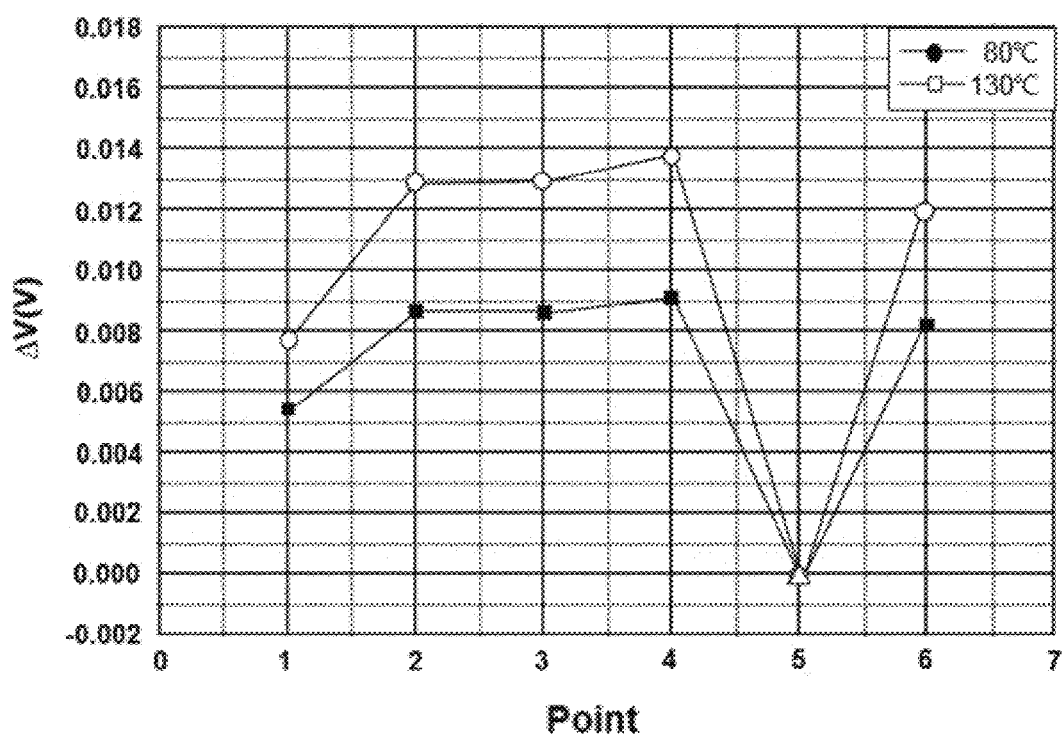

[FIG. 8]
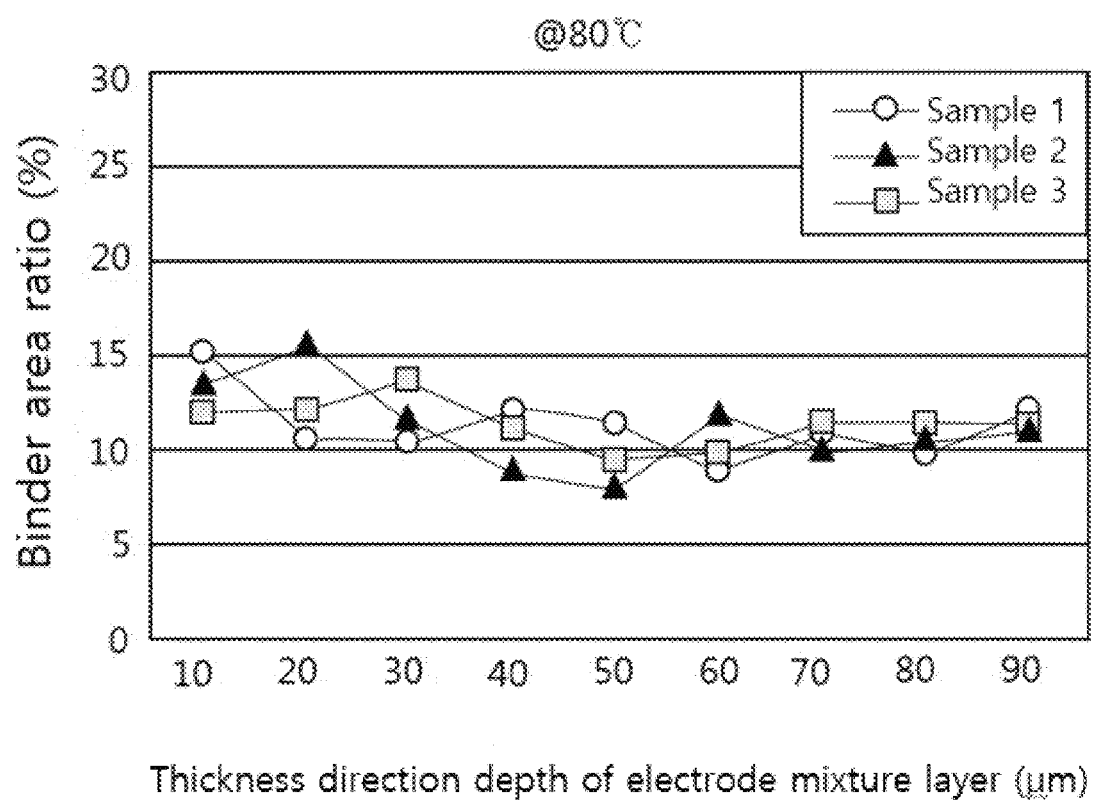

[FIG. 9]
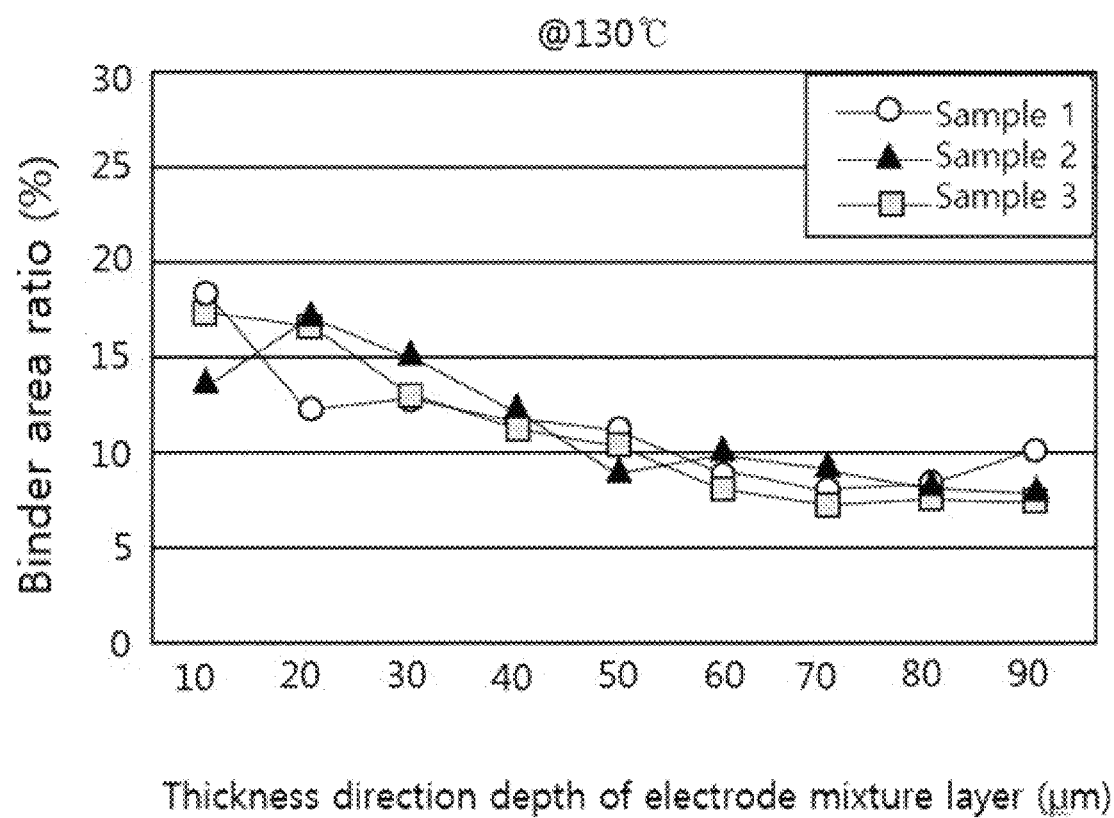

METHOD AND DEVICE FOR EVALUATING DISPERSION OF BINDER IN ELECTRODE MIXTURE LAYER

TECHNICAL FIELD

The present invention relates to a method and an apparatus for evaluating the dispersibility in the thickness direction of a binder in an electrode mixture layer.

This application claims the benefit of priority based on Korean Patent Application No. 10-2019-0162497, filed on Dec. 9, 2019, and the entire contents of the Korean patent application are incorporated herein by reference.

BACKGROUND ART

As technologies for mobile devices are developed and demand for the mobile devices increases, there has been a rapid increase in demand for secondary batteries as energy sources.

Among such secondary batteries, lithium secondary batteries, which exhibit a high energy density and operational potential, a long cycle life, and a low self-discharge rate have been commercialized and widely used.

In recent years, there has been a growing interest in environmental issues, and as a result, recently, electric vehicles (EVs) and hybrid electric vehicles (HEVs), which can replace fossil-fueled vehicles such as gasoline vehicles and diesel vehicles, and the like are widely studied. Lithium secondary batteries having high energy density, high discharge voltage, and output stability are mainly studied and used as a power source for electric vehicles (EV) and hybrid electric vehicles (HEV).

In general, such a lithium secondary battery is manufactured by embedding an electrode assembly including a positive electrode, a negative electrode, and a separator in a battery case in a state impregnated with an electrolyte solution. The electrode such as the positive electrode or negative electrode has a structure in which an electrode mixture layer is formed on one or both surfaces of a current collector. In order to manufacture the electrode mixture layer, an electrode slurry including an active material, a conductive material, and a binder is prepared, and the slurry is then applied to an electrode current collector, which is then dried and rolled.

The performance of the lithium secondary battery is greatly affected by the manufactured electrode. For example, in the process of drying the electrode, a component in the mixture layer, particularly, a binder flows. The flow of the binder affects the interfacial bonding between the current collector and the mixture layer, and changes the conductivity in the electrode mixture layer. Therefore, there is a high need for a technology capable of effectively analyzing or evaluating the dispersibility of a binder in an electrode mixture layer.

DISCLOSURE

Technical Problem

The present invention was invented in consideration of the above problems, and the present invention relates to a method and apparatus for evaluating the dispersibility in the thickness direction of a binder in an electrode mixture layer by a non-destructive method.

Technical Solution

The present invention relates to a method for evaluating the dispersibility of a binder in the thickness direction in an electrode mixture layer. In one example, the method according to the present invention includes:

a step of setting an arbitrary reference point ($n_o$) on a surface of an electrode mixture layer in a state where current is applied to an electrode mixture layer, and measuring a potential difference (V) with each reference point ($n_o$) at n points having different separation distances from the set reference point ($n_o$) where n is an integer greater than or equal to 2;

a step of setting any one potential difference among the measured potential differences as a reference voltage and calculating a voltage difference ($\Delta V$) from the reference voltage; and a step of comparing the calculated voltage difference ($\Delta V$) with a preset reference value, and calculating a dispersion in a thickness direction of a binder in the electrode mixture layer.

In one example, the step of measuring the potential difference (V) includes:

a process of calculating a potential difference ($V_1$) between a reference point ($n_o$) on the surface of the electrode mixture layer and a first point ($n_1$) spaced apart from the reference point ($n_o$); and a process of calculating a potential difference ($V_k$) between the reference point ($n_o$) and a k-th point ($n_k$) spaced from the reference point ($n_o$) by another interval where k is an integer in a range between 2 and n.

In a specific example, in the step of measuring the potential difference V, the processes of calculating each potential difference are performed simultaneously or sequentially.

In further another example, the step of measuring the potential difference (V) includes: a process of setting an arbitrary reference point ($n_o$) on the surface of the electrode mixture layer; a process of specifying n potential difference measurement points spaced apart from the set reference point ($n_o$) by a different distance; and a process of measuring the potential difference (V) between the reference point ($n_o$) and each voltage measurement point in a state where a current is applied to the electrode mixture layer.

In a specific example, in the step of measuring the potential difference (V), the process of specifying n potential difference measurement points includes designating a rectangular region which is formed within a constant voltage measurement region and where, on average, p voltage probes in a horizontal direction and q voltage probes in a vertical direction are arranged at regular intervals, in which p and q are each 1 or more, but a product of p and q is an integer equal to n.

In one example, in the method according to the present invention, at least two current application points are further included at an external side of n potential difference measurement points.

In a specific example, in the step of calculating the voltage difference $\Delta V$, the largest potential difference among the measured potential differences is set as the reference voltage.

The present invention provides an apparatus for evaluating the dispersibility of a binder in the thickness direction in the electrode mixture layer. The apparatus is an apparatus for performing the method described above.

In one example, the apparatus includes a measuring unit in which a number of probes are formed on a measurement surface in contact with an electrode mixture layer to be measured.

Herein, the measuring unit includes:

a ground probe;

n voltage probes arranged at different intervals from the ground probe where n is an integer of 2 or more; and current probes arranged at regular intervals at an external side of a region in which the voltage probes are formed, and the potential difference between each voltage probe and the ground probe is measured in a state that the current is applied through the current probe.

In a specific example, on average, p voltage probes in a horizontal direction and q voltage probes in a vertical direction are arranged on a rectangular region at regular intervals. Herein, p and q are each 1 or more, but a product of p and q is an integer equal to n. For example, p and q are each an integer of 3 to 8.

In one example, the apparatus further includes a data processing unit configured to set one of potential differences measured from a measuring unit as a reference voltage, calculating a voltage difference ($\Delta V$) from the reference voltage, and evaluate dispersibility in a thickness direction of a binder in an electrode mixture layer by comparing the calculated voltage difference ($\Delta V$) with a preset reference value.

Advantageous Effects

According to the method and apparatus for evaluating the binder dispersibility in the electrode mixture layer according to the present invention, the dispersibility in the thickness direction of the binder in the electrode mixture layer can be evaluated in a non-destructive manner.

BRIEF DESCRIPTION OF THE DRAWINGS

FIG. 1 is a schematic diagram showing a process of performing an evaluation method according to an embodiment of the present invention.

FIG. 2 is a schematic diagram showing a measurement surface of an evaluation apparatus according to another embodiment of the present invention.

FIGS. 3 and 6 are graphs showing results of measuring a potential difference in each voltage probe in a state in which a current is applied to an electrode mixture layer through a current probe, respectively, according to an evaluation method according to an embodiment of the present invention.

FIGS. 4 and 7 are graphs showing the result of calculating a voltage difference ($\Delta V$) from a reference voltage for each point according to an evaluation method according to one embodiment of the present invention, respectively.

FIGS. 5, 8, and 9 are graphs showing the dispersibility of a binder with respect to a cut surface after diagonally cutting an electrode mixture layer, respectively.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a method for evaluating the dispersibility of a binder in the thickness direction in the electrode mixture layer. In one example, the method according to the present invention includes: a step of setting an arbitrary reference point ($n_o$) on a surface of an electrode mixture layer in a state where current is applied to the electrode mixture layer, and measuring a potential difference (V) with each reference point ($n_o$) at n points having different separation distances from the set reference point ($n_o$) where n is an integer greater than or equal to 2; a step of setting any one potential difference among the measured potential differences as a reference voltage and calculating a voltage difference ($\Delta V$) from the reference voltage; and a step of comparing the calculated voltage difference ($\Delta V$) with a preset reference value, and calculating a dispersion in a thickness direction of a binder in the electrode mixture layer.

In the step of measuring the potential difference V with the reference point ($n_o$), the points for measuring the potential difference are two or more points, and specifically, may be 2 to 100 points or 5 to 60 points. If the number of points for measuring the potential difference increases, the reliability of the evaluation can be increased, but the manufacturing cost of the equipment performing the evaluation method increases. The points at which the potential difference is measured should have at least one point having a different separation distance from the reference point ($n_o$), and a case where two different points have the same separation distance from the reference point ($n_o$) may also be included.

In the evaluation method according to the present invention, a potential difference is measured at two or more points having different separation distances from the surface of the electrode mixture layer. Based on the measured results, by setting a reference voltage and calculating a voltage difference for each point, it is possible to check the dispersibility of the binder in the electrode mixture layer. Conventionally, in order to evaluate the dispersibility of the binder in the electrode mixture layer, the electrode mixture layer to be evaluated was cut and the degree of dispersion of the binder on the cut surface was measured using IR or Raman spectrum. However, the existing evaluation method is a destructive method in that the electrode mixture layer to be evaluated should be cut. On the other hand, the present invention can evaluate the dispersibility of the binder in the electrode mixture layer by a non-destructive method.

In one example, the step of measuring the potential difference (V) includes: a process of calculating a potential difference ($V_1$) between a reference point ($n_o$) on the surface of the electrode mixture layer and a first point ($n_1$) spaced apart from the reference point ($n_o$); and a process of calculating a potential difference ($V_k$) between the reference point ($n_o$) and a k-th point ($n_k$) spaced from the reference point ($n_o$) by another interval where k is an integer in a range between 2 and n.

In a specific embodiment, in the step of measuring the potential difference V, the processes of calculating each potential difference are performed simultaneously or sequentially. For example, the step of measuring the potential difference V may be performed using an apparatus in which a plurality of voltage probes are formed on a measurement surface. In this case, it is possible to measure the potential difference at a plurality of points at the same time in a state that a current has been applied to the electrode mixture layer. Alternatively, it is also possible to measure the potential difference at a plurality of points sequentially in a state in which a current has been applied to the electrode mixture layer.

In further another example, the step of measuring the potential difference (V) includes: a process of setting an arbitrary reference point ($n_o$) on the surface of the electrode mixture layer; a process of specifying n potential difference measurement points spaced apart from the set reference point ($n_o$) by a different distance; and a process of measuring the potential difference (V) between the reference point ($n_o$) and each voltage measurement point in a state where a current is applied to the electrode mixture layer. For example, the step of measuring the potential difference V may be performed using an apparatus in which a ground probe and a plurality of voltage probes are formed on a measurement surface. In addition, the measurement surface may have a structure in which a current probe for applying a current is formed together.

In a specific example, in the step of measuring the potential difference (V), the process of specifying n potential difference measurement points includes designating a rectangular region which is formed within a constant voltage measurement region and where, on average, p voltage probes in a horizontal direction and q voltage probes in a vertical direction are arranged at regular intervals, in which p and q are each 1 or more, but a product of p and q is an integer equal to n. This means a structure in which points measuring the potential difference are arranged in a rectangular area. This is suggested as an example, and a structure in which points measuring the potential difference may be arranged in a radial, semicircular or circular shape, or may also be arranged in a form of a polygon such as a triangle or a hexagon.

In one embodiment, the evaluation method further includes two or more current application points outside the n potential difference measurement points. This means measuring the potential difference at each point in a state where a current is applied to the electrode mixture layer. For example, the current application point may be formed outside the point where the potential difference is measured.

In another embodiment, in the step of calculating the voltage difference $\Delta V$, the largest potential difference among the measured potential differences is set as the reference voltage. In the evaluation method according to the present invention, a potential difference is measured at a plurality of points in the electrode mixture layer. Among the measured potential differences, the point showing the largest potential difference can be interpreted as reflecting the resistance of both the upper and lower portions of the electrode mixture layer. However, points at which the measured potential difference is substantially close to "0" may be excluded from the evaluation.

In addition, the present invention provides an evaluation apparatus for performing the evaluation method described above. The evaluation apparatus is an evaluation apparatus for evaluating the dispersibility in the thickness direction of the binder in the electrode mixture layer. In one example, the apparatus according to the present invention includes a measuring unit in which a number of probes are formed on a measurement surface in contact with an electrode mixture layer to be measured. Herein, the measuring unit includes: a ground probe; n voltage probes arranged at different intervals from the ground probe where n is an integer of 2 or more; and current probes arranged at regular intervals at an external side of a region in which the voltage probes are formed. In addition, the potential difference between each voltage probe and the ground probe is measured in a state that the current is applied through the current probe.

Two or more voltage probes may be formed, and specifically, 2 to 100 or 5 to 60 voltage probes may be formed. If the number of voltage probes increases, the reliability of evaluation can be increased, but the unit cost of the apparatus increases. The position of the voltage probe should be at least one point having a different separation distance from the ground probe, but may include a case where two different voltage probes have the same separation distance as the ground probe.

In a specific example, on average, p voltage probes in a horizontal direction and q voltage probes in a vertical direction are arranged on a rectangular region at regular intervals. Herein, p and q are each 1 or more, but a product of p and q is an integer equal to n. For example, p and q are each an integer of 3 to 8. The arrangement of the voltage probes refers to a structure in which a plurality of voltage probes are arranged in a rectangular area. This is suggested as an example, and includes cases in which the voltage probes are arranged in various forms described above.

In one example, the apparatus further includes a data processing unit configured to set one of potential differences measured from a measuring unit as a reference voltage, calculating a voltage difference ($\Delta V$) from the reference voltage, and evaluate dispersibility in a thickness direction of a binder in an electrode mixture layer by comparing the calculated voltage difference ($\Delta V$) with a preset reference value. The evaluation apparatus according to the present invention may process the measured result through the data processing unit and check the degree of dispersion of the binder in the electrode mixture layer.

In addition, the electrode to be evaluated for the binder dispersibility in the present invention is a positive electrode or a negative electrode of the battery. The battery is a secondary battery, for example, a lithium secondary battery. The lithium secondary battery is a generic term for a case containing lithium in a secondary battery, and specifically includes a positive electrode, a negative electrode, and a separator interposed between the positive electrode and the negative electrode. Hereinafter, specific components of each electrode will be described, but the scope of the present invention is not limited thereto.

The positive electrode has a structure in which a positive electrode mixture layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode mixture layer includes a conductive material and a binder polymer in addition to the positive electrode active material, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0 \le y<1$), $Li_xNi_{1-y}Mn_yO_2$ ($0.5<x<1.3$, $O \le y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), and the lithium-containing transition metal oxide may be coated with a metal or metal oxide such as aluminum (Al). Further, in addition to the lithium-containing transition metal oxide, one or more of sulfide, selenide, and halide may be used.

The positive electrode active material may be included in the range of 90 to 99 wt % in the positive electrode active material layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof.

The positive electrode active material layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, one or more selected from the group consisting of graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; and polyphenylene derivative may be used as the conductive material.

As the binder component, a binder polymer commonly used in the art may be used without limitation. For example, various kinds of binders such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used.

Further, the negative electrode has a structure in which a negative electrode mixture layer is stacked on one or both sides of a negative electrode current collector. In one example, the negative electrode mixture layer includes a negative electrode active material, a conductive material, and a binder polymer, and if necessary, may further include a negative electrode additive commonly used in the art.

The negative electrode active material may include a carbon material, lithium metal, silicon or tin. When a carbon material is used as the negative electrode active material, both low crystalline carbon and high crystalline carbon may be used. Representative examples of low crystalline carbon include soft carbon and hard carbon are typical. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

Hereinafter, the present invention will be described in more detail through drawings and the like.

FIG. 1 is a schematic diagram showing a process of performing an evaluation method according to an embodiment of the present invention. Referring to FIG. 1, an apparatus for evaluating the dispersibility of a binder in an electrode mixture layer includes a measuring unit 10 in which a plurality of probes are formed. The measuring unit includes: a ground probe 11; a plurality of voltage probes 12 arranged at different intervals from the ground probe; and current probes 13 arranged at regular intervals at an external side of a region in which the voltage probes are formed. In a state in which current is applied to the electrode mixture layer 21 through the current probe 13, each voltage probe 12 measures a potential difference with the ground probe 11.

The electrode 20 to be evaluated has a structure in which a mixture layer 21 is formed on both surfaces of the current collector 22. For example, the current collector 22 is formed of aluminum foil, and the mixture layer 21 is a positive electrode mixture layer containing lithium.

Each probe measures a potential, and a potential difference measurement result 30 is calculated. The potential measured by the ground probe 11 becomes the reference potential (0), and a potential difference for each point is derived from the difference between the reference potential (0) and the potentials (1 to 4) measured by each voltage probe.

FIG. 2 is a schematic diagram showing a measurement surface of an evaluation apparatus according to another embodiment of the present invention. Referring to FIG. 2, the measuring unit includes: a ground probe 11; a plurality of voltage probes 12 arranged at different intervals from the ground probe; and current probes 13 arranged at regular intervals at an external side of a region in which the voltage probes are formed. In a state in which current is applied to the electrode mixture layer 21 through the current probe 13, the potential difference between each voltage probe 12 and the ground probe 11 is measured. A total of 25 voltage probes 12 are formed, and 5 voltage probes in a horizontal direction and 5 voltage probe in a vertical direction are arranged in a rectangular region.

A ground probe 11 is positioned on one side of the measuring unit 10, and a current probe 13 is positioned outside the rectangular region in which the voltage probes 12 are arranged. The current probes 13 have a structure in which a total of 20 current probes are formed, 5 each on one side.

Hereinafter, the present invention will be described in more detail through examples. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

[Preparation Example 1] Preparation of Negative Electrode

Graphite as a negative electrode active material, cyanoethyl polyvinyl alcohol as a dispersant, and PVdF (polyvinylidene fluoride) as a binder were weighed in a weight ratio of 95.6:1:2:1.1, respectively, which was put in NMP and was mixed for 1 hour at 1,000 rpm in a Homo mixer, to thereby prepare a slurry for a negative electrode.

The prepared slurry for negative electrode was applied to a copper foil having a thickness of 20 μm at a thickness of 100 μm. Then, the copper foil was dried at 40° C. and was then rolled to thereby prepare a negative electrode.

[Preparation Example 2] Preparation of Negative Electrode

A slurry for negative electrode was prepared in the same manner as in Preparation Example 1. The prepared slurry for negative electrode was applied to a copper foil having a thickness of 20 μm at a thickness of 100 μm. Then, the copper foil was dried at 80° C. and was then rolled to thereby prepare a negative electrode.

[Preparation Example 3] Preparation of Negative Electrode

A slurry for negative electrode was prepared in the same manner as in Preparation Example 1. The prepared slurry for negative electrode was applied to a copper foil having a thickness of 20 μm at a thickness of 100 μm. Then, the copper foil was dried at 120° C. and was then rolled to thereby prepare a negative electrode.

[Preparation Example 4] Preparation of Positive Electrode $LiNi_{0.5}Mn_{0.3}Co_{0.2}$ as positive electrode active material, Super C as conductive material, cyanoethyl polyvinyl alcohol as dispersion material, and PVdF as binder were weighed in a weight ratio of 95:3:0.3:1.7, respectively, which was then put in NMP and was mixed for 1 hour at 1,000 rpm in a Homo mixer, to thereby prepare a slurry for a positive electrode.

The prepared slurry for positive electrode was applied to an aluminum foil having a thickness of 20 μm at a thickness of 100 μm. Then, the aluminum foil was dried at 80° C. and was then rolled to thereby prepare a positive electrode.

[Preparation Example 5] Preparation of Positive Electrode

A slurry for positive electrode was prepared in the same manner as in Preparation Example 4. The prepared slurry for positive electrode was applied to an aluminum foil having a thickness of 20 μm at a thickness of 100 μm. Then, the aluminum foil was dried at 130° C. and was then rolled to thereby prepare a positive electrode.

[Example 1] Evaluation of Binder Dispersibility for Negative Electrode Mixture Layer Using the evaluation apparatus according to the present invention, the binder dispersibility was evaluated for the electrode specimens prepared in Preparation Examples 1 to 3.

Specifically, the evaluation apparatus illustrated in FIG. 1 was used, and the measuring unit of the apparatus includes: a ground probe; 6 voltage probes arranged at different intervals from the ground probe; and current probes arranged at regular intervals at an external side of a region in which the voltage probes are formed.

In a state in which a current was applied to the electrode mixture layer through a current probe, a potential difference was measured in each voltage probe. The measured results are shown in FIG. 3. Referring to FIG. 3, it was measured that the potential difference was the largest at point 5. This indicates the resistance from the upper portion to the lower portion of the mixture layer as point 5 is the farthest from the ground probe. The potential difference at points 2, 3 and 6 reflects the resistance of the upper portion of the mixture layer. And, at point 4, the potential difference was measured to be close to 0, and this is excluded from the evaluation.

Then, the measured value at the point 5 having the largest potential difference was set as the reference voltage, the voltage difference ($\Delta V$) from the reference voltage was calculated for each point, and the result is shown in FIG. 4. Referring to FIG. 4, it can be seen that the voltage difference $\Delta V$ at points 2, 3, and 6 increases as the drying temperature of the specimen increases. The fact that the difference ($\Delta V$) between the potential difference at points 2, 3 and 6 reflecting the resistance of only the upper portion and the potential difference at point 5 reflecting the resistance of the upper portion and the lower portion is large means that relatively more binders are distributed in the upper portion.

This means that the binder moves toward the upper portion during the drying process of the electrode, and a larger amount of the binder is placed on the upper portion as the drying temperature increases.

[Comparative Example 1] Verification of Evaluation of Binder Dispersibility for Negative Electrode Mixture Layer Binder dispersibility was verified for the electrode specimens prepared in Preparation Examples 1 to 3. Each electrode specimen was obliquely cut at an angle of 1.5°, and then IR and Raman spectra were measured for the inclined surface to confirm actual binder dispersibility. FIG. 5 is a graph showing the dispersibility of the binder according to the depth of the mixture layer.

Referring to FIG. 5, it can be seen that the binder moves to the upper portion of the mixture layer according to the drying temperature of the electrode specimen. This corresponds to the result of Example 1 that the binder moves toward the upper portion of the mixture layer as the drying temperature of the electrode increases.

[Example 2] Evaluation of Binder Dispersibility for Positive Electrode Mixture Layer Using the evaluation apparatus according to the present invention, the binder dispersibility was evaluated for the electrode specimens prepared in Preparation Examples 4 and 5.

Specifically, the evaluation apparatus illustrated in FIG. 1 was used, and the measuring unit of the apparatus includes: a ground probe; 6 voltage probes arranged at different intervals from the ground probe; and current probes arranged at regular intervals at an external side of a region in which the voltage probes are formed.

In a state in which a current was applied to the electrode mixture layer through a current probe, a potential difference was measured in each voltage probe. The measured results are shown in FIG. 6. Referring to FIG. 6, it was measured that the potential difference was the largest at point 5. This indicates the resistance from the upper portion to the lower portion of the mixture layer as point 5 is the farthest from the ground probe. The potential difference at points 2, 3 and 6 reflects the resistance of the upper portion of the mixture layer. And, at point 4, the potential difference was measured to be close to 0, and this is excluded from the evaluation.

Then, the measured value at the point 5 having the largest potential difference was set as the reference voltage, the voltage difference ($\Delta V$) from the reference voltage was calculated for each point, and the result is shown in FIG. 7. Referring to FIG. 7, it can be seen that the voltage difference $\Delta V$ at points 2, 3, and 6 increases as the drying temperature of the specimen increases. The fact that the difference ($\Delta V$) between the potential difference at points 2, 3 and 6 reflecting the resistance of only the upper portion and the potential difference at point 5 reflecting the resistance of the upper portion and the lower portion is large means that relatively more binders are distributed in the upper portion.

This means that the binder moves toward the upper portion during the drying process of the electrode, and a larger amount of the binder is placed on the upper portion as the drying temperature increases.

[Comparative Example 2] Verification of Evaluation of Binder Dispersibility for Positive Electrode Mixture Layer Binder dispersibility was verified for the electrode specimens prepared in Preparation Examples 4 and 5. Each electrode specimen was obliquely cut at an angle of 1.5°, and then IR and Raman spectra were measured for the inclined surface to confirm actual binder dispersibility. To check the dispersibility, the experiment was repeated three times for each specimen. FIG. 8 is a graph showing the experimental results for the electrode specimen according to Preparation Example 4, and FIG. 9 is a graph showing experimental results for an electrode specimen according to Preparation Example 5.

Referring to FIG. 8, it can be seen that in the electrode specimen of Preparation Example 4 dried at 80° C., the binder was evenly dispersed in the thickness direction of the mixture layer. On the other hand, referring to FIG. 9, it can be seen that in the electrode specimen of Preparation Example 5 dried at 130° C., the binder was somewhat concentrated toward the upper portion of the mixture layer and dispersed.

This corresponds to the result of Example 2 that the binder moves toward the upper portion of the mixture layer as the drying temperature of the electrode increases.

DESCRIPTION OF REFERENCE NUMERALS

10: measuring unit
11: ground probe
12: voltage probe
13: current probe
20: electrode
21: mixture layer
22: current collector
30: Potential difference measurement result

What is claimed is:

1. A method for evaluating dispersibility of a binder in thickness direction in an electrode mixture layer, comprising:
    setting an arbitrary reference point ($n_o$) on a surface of the electrode mixture layer in a state where current is applied to the electrode mixture layer, and measuring a potential difference (V) with the set reference point ($n_o$) at n points each having different separation distances from the set reference point ($n_o$) where n is an integer greater than or equal to 2;
    setting any one potential difference among the measured potential differences as a reference voltage and calculating a voltage difference ($\Delta V$) from the reference voltage; and
    comparing the calculated voltage difference ($\Delta V$) with a preset reference value, and calculating a dispersion in a thickness direction of a binder in the electrode mixture layer.

2. The method of claim 1, wherein the measuring the potential difference (V) comprises:
    calculating a potential difference ($V_1$) between the reference point ($n_o$) on the surface of the electrode mixture layer and a first point ($n_1$) spaced apart from the reference point ($n_o$); and
    calculating a potential difference ($V_k$) between the reference point ($n_o$) and a k-$^{th}$ point ($n_k$) spaced from the reference point ($n_o$) by another interval where k is an integer in a range between 2 and n.

3. The method of claim 2, wherein in the measuring the potential difference (V), calculating each potential difference are performed simultaneously or sequentially.

4. The method of claim 1, wherein the measuring the potential difference (V) comprises:
    specifying n potential difference measurement points spaced apart from the set reference point ($n_o$) by a different distance; and
    measuring the potential difference (V) between the reference point ($n_o$) and each voltage measurement point in a state where a current is applied to the electrode mixture layer.

5. The method of claim 4, wherein in the measuring the potential difference (V), the specifying n potential difference measurement points includes designating a rectangular region which is formed within a constant voltage measurement region and where, on average, p voltage probes in a horizontal direction and q voltage probes in a vertical direction are arranged at regular intervals, and
    wherein p and q are each an integer of 1 or more, and a product of p and q is an integer equal to n.

6. The method of claim 1, wherein at least two current application points are further included at an external side of n potential difference measurement points.

7. The method of claim 1, wherein in the calculating the voltage difference ($\Delta V$), a largest potential difference among the measured potential differences is set as the reference voltage.

8. An apparatus for evaluating dispersibility of a binder in a thickness direction in an electrode mixture layer, comprising:
    a measuring unit in which a number of probes are formed on a measurement surface in contact with the electrode mixture layer to be measured,
    wherein the measuring unit comprises:
    a ground probe;
    n voltage probes arranged at different intervals from the ground probe where n is an integer of 2 or more; and
    current probes arranged at regular intervals at an external side of a region in which the voltage probes are formed,
    wherein the potential difference between each voltage probe and the ground probe is measured in a state that the current is applied through the current probe.

9. The apparatus of claim 8, wherein, on average, p voltage probes in a horizontal direction and q voltage probes in a vertical direction are arranged on a rectangular region at regular intervals,
    wherein p and q are each an integer of 1 or more, and a product of p and q is an integer equal to n.

10. The apparatus of claim 9, wherein p and q are each an integer of 3 to 8.

11. The apparatus of claim 8, further comprising a data processing unit configured to set one of potential differences measured from the measuring unit as a reference voltage, calculating a voltage difference ($\Delta V$) from the reference voltage, and evaluate dispersibility in a thickness direction of a binder in an electrode mixture layer by comparing the calculated voltage difference (ΔV) with a preset reference value.

\* \* \* \* \*